Aug. 17, 1954  M. SEPPALA  2,686,380
FAN TYPE DREDGE
Filed Oct. 23, 1950  4 Sheets-Sheet 1
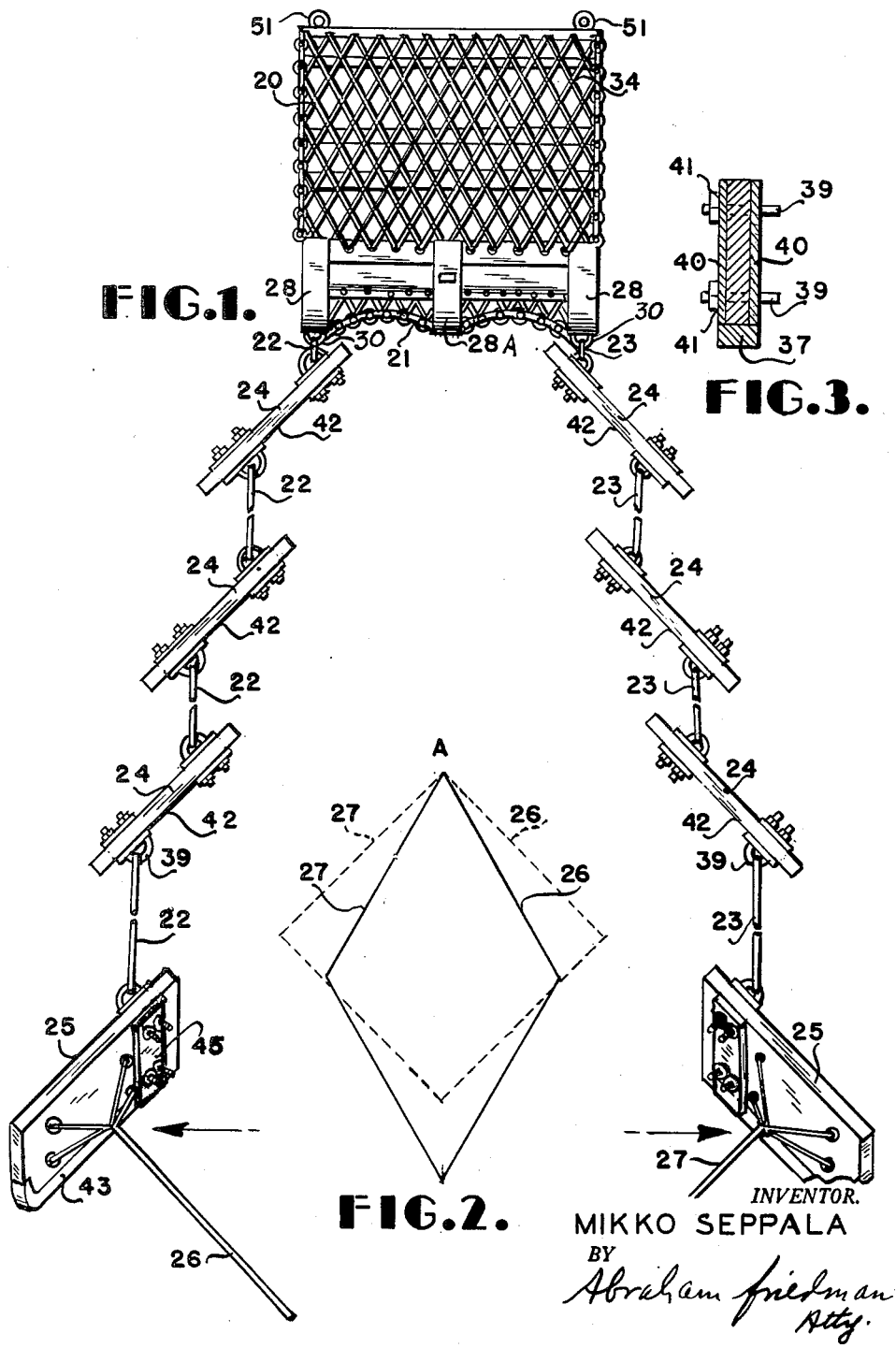
INVENTOR.
MIKKO SEPPALA
BY Abraham Friedman
Atty.

Aug. 17, 1954 M. SEPPALA 2,686,380
FAN TYPE DREDGE
Filed Oct. 23, 1950 4 Sheets-Sheet 2

INVENTOR.
MIKKO SEPPALA
BY Abraham Friedman
Atty.

INVENTOR.
MIKKO SEPPALA
BY Abraham Friedman
Atty.

Aug. 17, 1954     M. SEPPALA     2,686,380
FAN TYPE DREDGE

Filed Oct. 23, 1950     4 Sheets-Sheet 4

INVENTOR.
MIKKO SEPPALA
BY
Abraham Friedman
Atty.

Patented Aug. 17, 1954

2,686,380

UNITED STATES PATENT OFFICE 2,686,380

FAN TYPE DREDGE

Mikko Seppala, Brooklyn, N. Y.

Application October 23, 1950, Serial No. 191,547

1 Claim. (Cl. 43—9)

This invention relates to fishing dredges, more particularly to a fan type dredge which is dragged over beds of water in order to catch scallops and other forms of marine life which inhabit the river, sea or ocean floor. This type of fishing is also often called ground fishing and the fish which are caught by this method are frequently designated as ground fish.

The principal object of this invention is to provide an improved means for ground fishing.

Another object of the invention is to provide a fan type dredge for ground fishing which will catch scallops from a substantially larger area than the conventional net.

Still another object of the invention is to provide a dredge for ground fishing in which the net will easily slide over irregularities in the bed of water and not become caught or embedded.

Yet another object is to provide a dredge for ground fishing in which the net will slide over the bed of water very close to the bottom so that few ground fish are passed over or remain uncaught.

Another object of the invention is to provide a dredge for ground fishing which will easily pass over uneven and rocky beds of water without losing a large part of the fish which have already been caught.

A further object of the invention is to provide a dredge for ground fishing which may be adjusted as to the area of the sea floor swept thereby.

A still further object of the invention is to provide a dredge for ground fishing which is easy to manipulate and control while the net is in the water.

Another object of the invention is to provide a dredge for ground fishing which is very durable and may be economically manufactured and the parts of which may be readily detached and replaced as desired.

Still another object of the invention is to provide an improved dredge for ground fishing in which the dredge appurtenances are on the bottom of the bed of water so that ground fish are forced into the mouth of the net as the net is dragged along.

Other further objects, purposes and advantages of the invention will become apparent from the description and claim which are appended.

Figure 4:
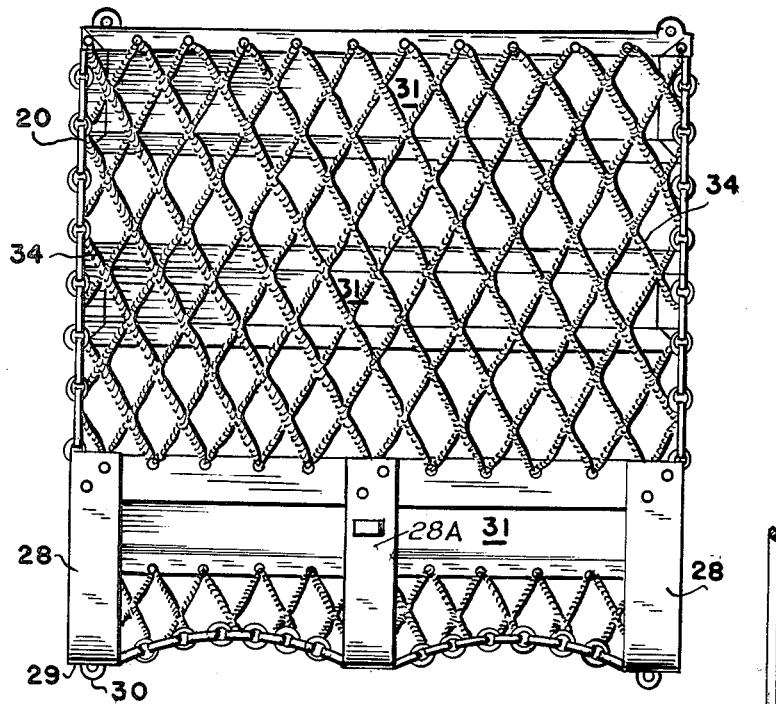
Figure 6:
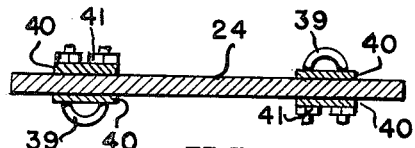
Figure 5:
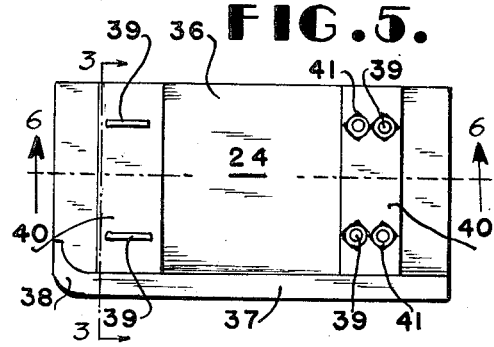
Figure 7:
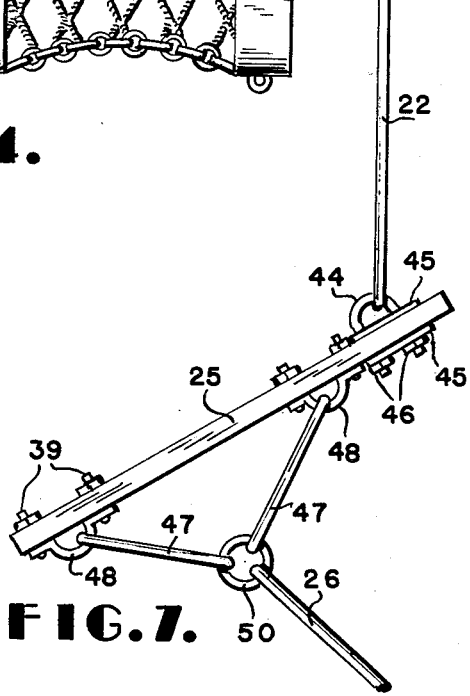
Figure 8:
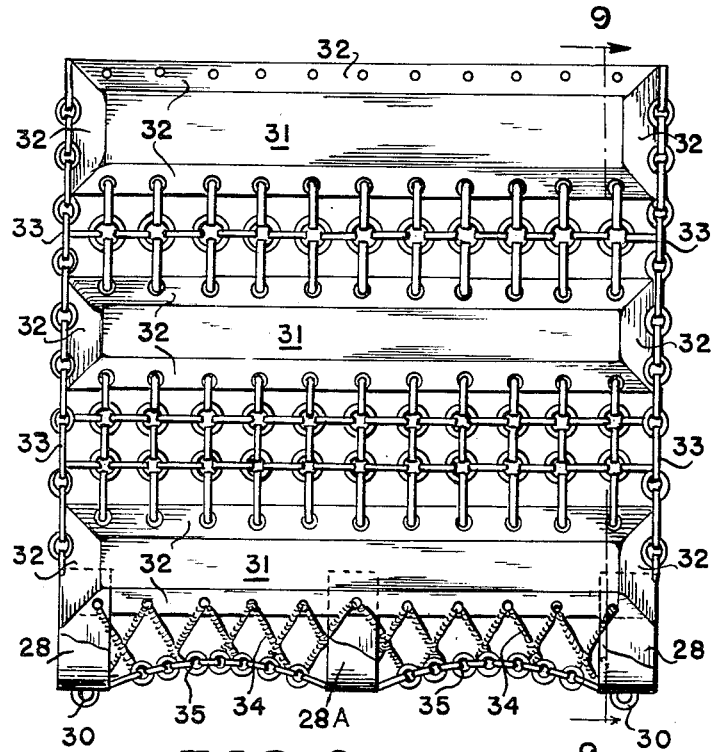
Figure 9:
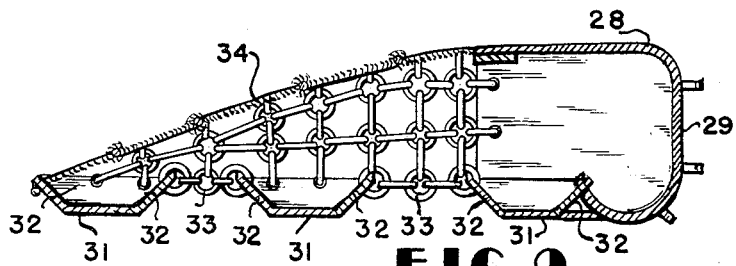
Figure 10:
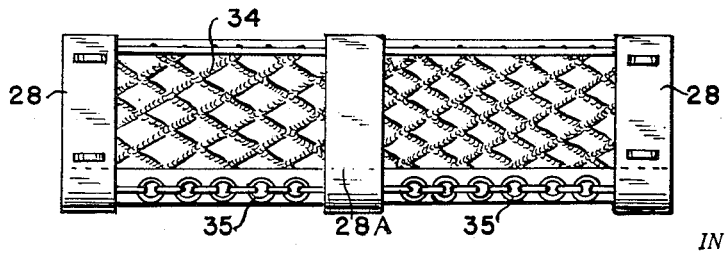
Figure 11:
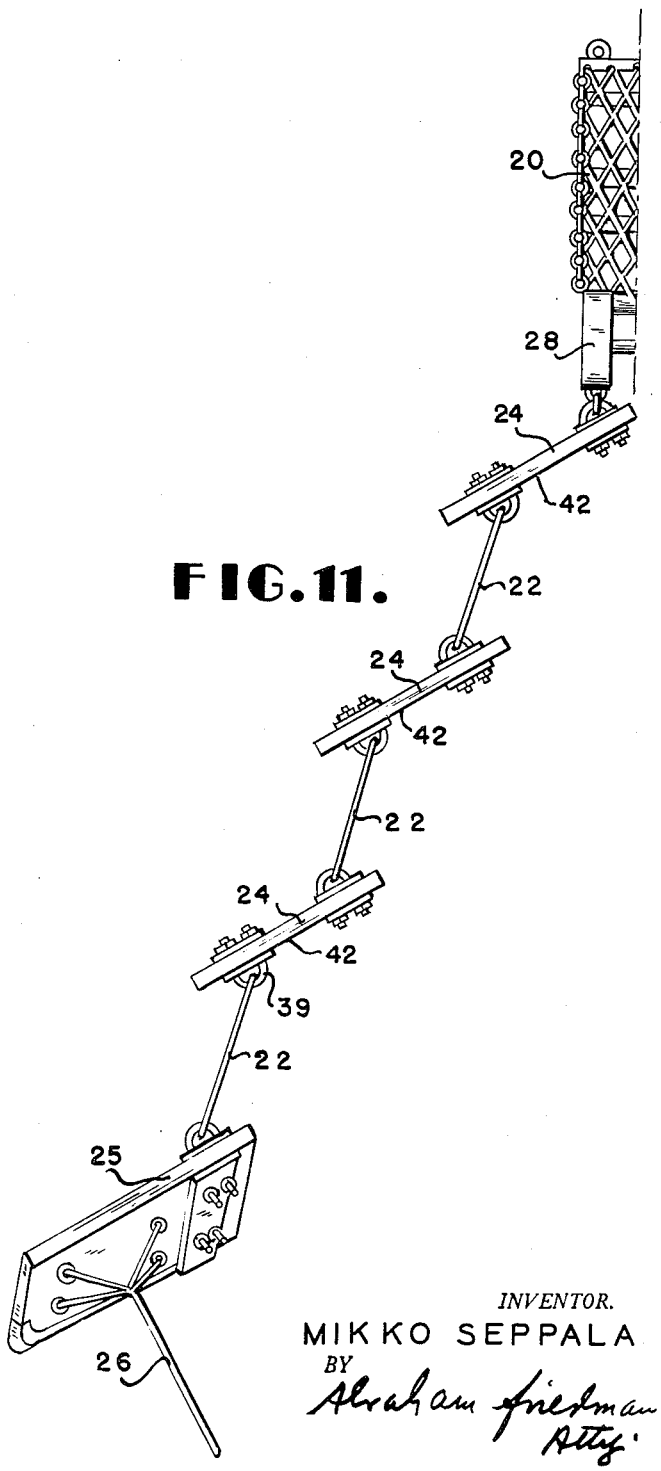

A more complete understanding of the invention will be obtained from the embodiment illustrated in the accompanying drawings wherein:

Figure 1 is a top view of an embodiment of the invention,

Figure 2 is a schematic drawing of the change in shape of the entire dredge due to the fanlike action of the oblique sides of the wing sideboards, Figure 3 is a sectional view of one of the wing sideboards taken along line 3—3 of Figure 5, Figure 4 is an enlarged view of the top of the net, Figure 5 is a side view of one of the wing sideboards, Figure 6 is a sectional view of the top of Figure 5, taken along line 6—6 of said figure, Figure 7 is an enlarged view of the top of a leader board, Figure 8 is an enlarged view of the bottom of the net, Figure 9 is a sectional view along line 9—9 of Figure 8, Figure 10 is a front view of the net, and Figure 11 is a partial view illustrating the spreading action of the wing sideboards.

Broadly speaking, the invention attains its objects by providing a dredge which is dragged along the bottom of the bed of water where scallops and other ground fish are to be caught. Instead of using netting which may be easily caught in underwater obstructions the invention uses a series of metal trays 31 for the bottom of the net. These trays are connected to each other by flexible chain links 33 and have beveled edges 32. By constructing the bottom of the net in this manner, it is easy to tow the net while at the same time the net is not easily caught by irregularities such as rocks, depressions and plants in the sea floor. The sides of the net are formed of two ski plates 28 which are also made of metal and have two rings or hooks 30 on their front faces. These rings or hooks are used to secure a series of wing sideboards to the net. In order to give the net added strength a third ski plate 28A is positioned midway between the two sides. The flexibly connected metallic trays 31 extend backward from the front faces of the ski plates and are connected to the ski plates by means of flexible chain links 33. The top and rear portions of the net 34 are formed of conventional netting although any other suitable material may be used.

In order to keep the entire arrangement as close to the bottom of the bed of water as possible, wing sideboards 24 and leader boards 25 are used connected to the towlines 26 and 27. As a matter of fact the arrangement is constructed in such a way that the wing sideboards 24 and leader boards 25 move along the bottom of the sea. A number of wing sideboards 24 are arranged in series and interconnected by cable sections 22 and 23. These wing sideboards are preferably formed of wood and have upwardly curved steel bottom plates 37 that act as runners as well as steel side bands 40 to which pairs of eyebolts 39 are fastened. The wing sideboards are interconnected by means of cable sections 22 and 23 secured to said eyebolts. The sideboards are positioned so that their side faces are at an oblique angle with respect to the longitudinal axis of the dredge. As the dredge is towed, water impinges on their oblique side faces and causes the wing sideboards at opposite sides of the net to move outwardly and spread away from each other in a direction normal to the longitudinal axis of the dredge by reason of the water pressure against the face of each of said sideboards. By inclining the sideboards oppositely and in the appropriate direction, the action of the sideboards is to cause the dredge arrangement to spread in a fanlike manner. Since the sideboards slide along the sea floor on their bottom plates the spreading or fan action results in gathering in fish from an extensively larger area than the conventional net.

Secured to each end sideboard is a leader board 25. These leader boards are made of wood and have a steel bottom plate 43 which acts as a runner. In addition, each leader board has attached to it steel side bands 45 to which a pair of eyebolts 44 are fastened. The cable sections from the end sideboards are fastened to these eyebolts. In addition equalizing eyebolts 48 are connected by means of links 47 to a central ring 50 for each leader board and these rings are fastened to each of two towlines 26 and 27 each of which is attached to the ship. The purpose of the equalizing links and the central ring is to distribute the main towing force exerted by the ship which is too great for a single eyebolt to withstand.

The term net as herein employed is intended to designate that portion of the device which comprises the trays and net structure covering the trays and is connected to ski plates 28. The term dredge is intended to include the sideboards as well as the net and tray structure.

Referring to Figure 1, the invention consists of a net 20 which has an open mouth at 21 and has pairs of cables 22 and 23 connected to it. At various points along the sections of cables 22 and 23 are wing sideboards 24. At the end of cables 22 and 23 which are farthest away from net 20 are leader boards 25 which have towlines 26 and 27 connected to them. Towlines 26 and 27 are attached to the ship which is pulling the dredge.

A detailed construction of the net is shown in Figures 4, 8, 9 and 10. Net 20 consists of ski plates 28 which are adjacent to open mouth 21 and are formed with solid side plates of a suitable metal that is capable of withstanding shock and strain to which the net is subjected. A center ski plate 28a is also provided. On the front face 29 of each ski plate 28 is located a pair of tow rings 30 which are used to attach the links or cables to the net. Three ski plates are used in the embodiment shown in the drawings although it is apparent that any other number may be used depending upon the circumstances under which the net is to be utilized. Attached to the bottom of ski plates 28 are trays 31 which have beveled edges 32 and are connected one to the other by means of chain links 33. Trays 31 are formed of metal as are links 33; it being understood that other materials with the requisite structural qualities may be used instead. Links 33 connect trays 31 in a sturdy but nevertheless flexible manner. By this construction it is possible for the bottom of net 20 which is formed of a series of trays 31 to assume a variety of positions as it is dragged along the sea, ocean or river floor. The beveled edges of trays 31 and the flexible connection between them afforded by links 33 enables net 20 to be easily dragged over a bed of water and permits net 20 to conform to the shape of the terrain so that the net will not easily be caught on any protrusions. The sides of the net are similarly enclosed by chain links. The top and rear of net 20 consists of rope netting 34 which runs from the top of ski plates 28 to the rearmost tray 31. The expression ski plate as used in this application is intended to refer to a rigid plate member having around its upper and forward edge and part of its bottom edge, a curved guide member to facilitate movement of the plate through a body of water and along a supporting surface. In addition, a ground chain 35 is used to afford the net additional strength. Netting 34 is formed of any usual type of sea net and chain 35 is formed of metal. It can be seen that the foregoing construction makes net 20 an open mouth net in the vicinity of ski plates 28 which extends to form a closed interior by means of the chain links at the bottom and sides and netting on top. Although three trays have been shown for purposes of illustration, any suitable number may be used. As net 20 is dragged along the sea, river or ocean floor, any ground fish which are caught are ultimately trapped by the net. Owing to the adaptability of net 20 to various types of underwater terrain, it is very difficult for a large portion of the catch to escape once they have been entrapped. Eyebolts 51 are secured at the rearward end of the net in order to permit the attachment of lines for dumping the contents of the net.

As shown in Figure 1, sections of cables 22 and 23 are connected to the pairs of tow rings 30 on ski plates 28 which are on the sides of net 20. At various intervals along cables 22 and 23 which is divided into a number of cable sections, wing sideboards 24 are located and are shown in detail in Figures 5 and 6. Each of said wing sideboards consists of body portion 36 which is preferably made of wood and a steel bottom plate 37 which is provided with a curved leading edge 38. Fastened to each side of the body 36 of each sideboard 24 are pairs of eyebolts 39 which extend through reenforcing steel bands 40. Eyebolts 39 are rigidly held to sideboards 24 by means of nuts 41. Four eyebolts 39 are used for each sideboard, two being provided on each side. As can be seen from Figures 1 and 11, sideboards 24 have their side faces 42 inclined with respect to the direction in which the net is being towed. Those sideboards connected by means of sections of cables 22 are inclined oppositely to those connected by means of cable sections 23. As shown sideboards 24 are joined to one another adjacent their top and bottom edges by means of connecting sections of cables 22 and 23 secured to eyebolts 39. From the orientation of the sideboards it is apparent that as the dredge is towed in a forward direction, water will impinge against their forward side faces in such a way as to cause them to spread or fan out and spread very extensively. This results in a very substantial increase in the area encompassed by the dredge which is illustrated schematically in Figure 2; the broken lines indicating the manner in which the dredge spreads as it is towed by a vessel at point A. Owing to the weight of bottom plates 37 provided on sideboards 24, the sideboards sink to the bottom of the bed of water and slide along the sea, river or ocean floor in an upright position, bottom plates 37 acting as runners. Curved ends 38 of bottom plates 37 permit the wing sideboards 24 to slide more easily on the bottom of the bed of water. The cable sections being secured adjacent the top and bottom edges of the sideboards additionally assure the maintenance of the sideboards in an upright position.

Secured at the end of cables 22 and 23 are leader boards 25 which are formed of wood and are provided with forwardly curved bottom plates 43. Pairs of eyebolts 44 are used to attach the cables to leader boards 25. Steel bands 45 and nuts 46 are used to secure eyebolts 44 to leader boards 25. In order to more evenly distribute the stress transmitted by towlines 26 and 27 which go to the ship or vessel towing the dredge, intermediate links 47 are used. Four of these links are attached to eyebolts 48 which in turn are secured to each leader board by means of bolts 39. Intermediate links 47 are joined to towlines 26 and 27 by means of stress rings 50.

From the foregoing description it can be seen that as the dredge is dragged through the water, net 20 slides along the sea, river or ocean floor. The action of the oblique side faces of wing sideboards 24 causes the dredge to fan out and cover an area far in excess of that which would be covered by the conventional net. Ground fish are forced into net 20 by reason of the action of the sideboards which fan out to encompass a wide funnel shaped area.

The ends of the sideboards overlap each other and form, in effect, a continuous barrier which fans out from each side of the net whereby scallops or other ground fish are progressively forced or raked into the mouth of the net proper. The foregoing results are obtained as a consequence of the fanlike outward divergence of the sideboards and their overlapping relation to each other. By keeping the dredge on the bottom of the bed of water where fishing is taking place very few ground fish are missed and a highly increased catch is assured in a short period of time.

A preferred embodiment of the invention has been shown and described. It is obvious that many changes, modifications and additions may be made without departing from the scope of the invention as herein disclosed and hereinafter claimed. Having disclosed the invention, what is claimed as new is:

In a dredge for ground fishing, an open mouth net, ski plates positioned at the opposite sides of said net at the open mouth thereof, a plurality of spaced trays flexibly connected to said ski plates and to each other, said net being secured to the top edges of one of said trays to form a closed end therefor and having sections of chain links extending upwardly from the sides of said trays forming sides of said net, the whole arranged so as to form a net with an open mouth which is adapted to slide over the irregularities in the bed of water, and a series of cables and wingboards connected to each of said ski plates, each wingboard having a rear end thereof connected to a forward end of a following wingboard and the rear end of the last wingboard being connected to one of said ski plates, and the wingboards when in towed position being in longitudinally overlapping relation and in such close proximity to each other that substantially all ground fish contacting the wingboards will be deflected toward the mouth of the net.

References Cited in the file of this patent

UNITED STATES PATENTS

| Number | Name | Date |
|---|---|---|
| 255,561 | Arapian | Mar. 28, 1882 |
| 379,422 | Smith | Mar. 13, 1888 |
| 589,047 | Thomas | Aug. 31, 1897 |
| 1,449,910 | Oertz | Mar. 27, 1923 |
| 1,842,634 | Symonds | Jan. 26, 1932 |
| 1,867,281 | Runkle | July 12, 1932 |
| 2,081,146 | Herrington | May 25, 1937 |

FOREIGN PATENTS

| Number | Country | Date |
|---|---|---|
| 19,122/29 | Australia | Oct. 8, 1929 |
| 170,916 | Great Britain | Oct. 27, 1921 |
| 174,250 | Great Britain | Jan. 26, 1922 |
| 249,028 | Great Britain | Mar. 18, 1926 |
| 405,405 | Great Britain | Feb. 8, 1934 |